United States Patent
DeMersseman et al.

(10) Patent No.: US 7,813,851 B2
(45) Date of Patent: Oct. 12, 2010

(54) SENSING MISALIGNMENT DETECTION AND ESTIMATION SYSTEM

(75) Inventors: Bernard DeMersseman, Rochester Hills, MI (US); Kangwon Lee, Ann Arbor, MI (US)

(73) Assignee: Autoliv ASP, Inc., Ogden, UT (US)

( * ) Notice: Subject to any disclaimer, the term of this patent is extended or adjusted under 35 U.S.C. 154(b) by 653 days.

(21) Appl. No.: 11/708,873

(22) Filed: Feb. 21, 2007

(65) Prior Publication Data

US 2008/0201033 A1   Aug. 21, 2008

(51) Int. Cl.
*G01P 3/00* (2006.01)
(52) U.S. Cl. .................. 701/34; 73/514.01; 180/282; 280/735
(58) Field of Classification Search .......... 701/29, 701/1, 45, 46, 34; 702/95, 153, 150, 154, 702/92; 180/282; 280/735; 340/440; 73/511, 73/514.32, 514.01, 514.02; *G01P 3/00*
See application file for complete search history.

(56) References Cited

U.S. PATENT DOCUMENTS

| | | | |
|---|---|---|---|
| 4,166,406 A | 9/1979 | Maughmer | |
| 4,287,765 A * | 9/1981 | Kreft | 73/514.31 |
| 5,313,213 A | 5/1994 | Neumann et al. | |
| 5,915,275 A * | 6/1999 | Cardarelli et al. | 73/504.03 |
| 5,950,952 A * | 9/1999 | Koketsu | 242/384.4 |
| 6,025,797 A | 2/2000 | Kawai et al. | |
| 6,055,841 A * | 5/2000 | Yamada et al. | 73/1.38 |
| 6,107,616 A * | 8/2000 | Dauwalter | 244/3.2 |
| 6,467,349 B1 | 10/2002 | Andersson et al. | |
| 6,556,166 B1 | 4/2003 | Searcy et al. | |
| 6,651,002 B1 * | 11/2003 | Morgan | 701/220 |
| 6,694,277 B2 | 2/2004 | Schneider et al. | |
| 6,750,811 B2 | 6/2004 | Asanuma et al. | |
| 6,795,752 B1 | 9/2004 | Zhao et al. | |
| 6,895,817 B2 * | 5/2005 | Campbell et al. | 73/510 |
| 6,900,755 B2 | 5/2005 | Richardson et al. | |
| 7,299,695 B2 * | 11/2007 | Tanaka et al. | 73/510 |
| 7,613,567 B2 * | 11/2009 | Hashiba | 701/220 |
| 2002/0087239 A1 * | 7/2002 | Kwon | 701/34 |
| 2003/0018430 A1 * | 1/2003 | Ladetto et al. | 701/217 |
| 2003/0102178 A1 * | 6/2003 | Ide et al. | 180/282 |
| 2004/0176882 A1 * | 9/2004 | Fukuda et al. | 701/4 |

(Continued)

OTHER PUBLICATIONS

International Search Report and Written Opinion—PCT/US08/53823—mailed on Sep. 18, 2008.

*Primary Examiner*—Tuan C To
(74) *Attorney, Agent, or Firm*—Sally J Brown; Brinks Hofer Gilson & Lione (57) ABSTRACT

A misalignment detection sensor assembly is provided, which includes a forward-looking sensor having a sensing direction along a first axis and an inertia sensor configured to sense acceleration along a second axis, the second axis having a fixed relationship with respect to the first axis. A misalignment detection system uses the misalignment detection sensor assembly and a signal processing system to calculate a misalignment angle between the first axis and the direction of forward motion of the sensor assembly. A method of detecting angular misalignment of a forward-looking sensor assembly is also disclosed, which includes measuring acceleration along an axis having a fixed relationship with respect to the sensing axis of the forward-looking sensor assembly and comparing the acceleration measurement with a predetermined threshold.

19 Claims, 5 Drawing Sheets

U.S. PATENT DOCUMENTS

| | | |
|---|---|---|
| 2004/0181329 A1 | 9/2004 | Tseng et al. |
| 2004/0222902 A1 | 11/2004 | Wortsmith |
| 2005/0237215 A1 | 10/2005 | Hatfield et al. |
| 2006/0007002 A1 | 1/2006 | Rastegar et al. |
| 2006/0080015 A1 | 4/2006 | Voeller |
| 2006/0293826 A1* | 12/2006 | Hong et al. .................. 701/96 |
| 2007/0032951 A1 | 2/2007 | Tanenhaus et al. |
| 2007/0088477 A1* | 4/2007 | Brewer et al. ................ 701/41 |

\* cited by examiner

SENSING MISALIGNMENT DETECTION AND ESTIMATION SYSTEM

BACKGROUND

1. Field of the Invention

This invention generally relates to motor vehicle sensor systems. More specifically, the invention relates to motor vehicle sensor systems having sensors that determine misalignment of a directional sensor.

2. Description of Related Art

In motor vehicle design, vehicle sensor systems are becoming increasingly important. Vehicles often include sensor systems used to sense the presence and distance of other vehicles traveling nearby, to alert the driver, or to automatically deploy certain safety and dynamic stability systems. Sensor systems may be configured to trigger vehicle safety systems or vehicle reaction systems, such as automatic braking or reduction of engine torque upon the occurrence of predetermined conditions. Such sensor systems may be used to provide a signal into a feedback control system. For example, a forward-sensing radar sensor may be part of a feedback control system that controls the speed of a vehicle based upon the distance of the vehicle traveling in front of it.

Other types of forward-looking sensors may use light or acoustic signals, or may use other forms of electromagnetic radiation, either actively (with an emitter) or passively (detection only). For the purposes of this description, a "forward-looking sensor" is any sensor oriented in a specific direction to detect conditions outside of the sensor. The "forward" is related to the sensor itself and not necessarily the forward direction of vehicle travel.

These types of vehicle forward-looking sensor systems must be very accurately aligned with respect to a geometric axis of a vehicle in order to properly sense the surrounding conditions that they are intended to measure. For example, the boresight of the sensor assembly might be required to be aligned with the direction of travel of the vehicle. If such a sensor assembly is not properly aligned, there must be compensation for misalignment in order to obtain a proper reading from the sensor assembly. Misalignment may result in mismeasurement of the desired surrounding circumstances. Such mismeasurement is undesirable because it may cause customer dissatisfaction and/or system performance concerns.

Various methods have been employed to determine sensor misalignment in the context of motor vehicles. For example, one known method of aligning a radar system is by using a second radar system to sense stationary objects along the side of the road. If the second radar senses that the objects are moving toward or away from the vehicle in a direction perpendicular to the direction of travel, it is evident that the first sensor assembly is misaligned. This method may be undesirable due to its complexity and costs.

Another known method of aligning a radar system is by aligning an optical axis with a light cone. This method may be undesirable because it may be time-consuming and costly to implement.

In view of the above, it is apparent that there exists a need for a system that is capable of efficiently determining whether a forward-looking sensor is misaligned.

SUMMARY OF THE INVENTION

In satisfying the above need, as well as overcoming the enumerated drawbacks and other limitations of the related art, the present invention provides a misalignment detection sensor assembly. The misalignment detection sensor assembly includes a forward-looking sensor having a sensing direction of design along a first axis and an inertia sensor configured to sense acceleration along a second axis, the second axis having a fixed relationship with respect to the first axis.

In another aspect, a misalignment detection system is provided. The system includes a sensor assembly including a forward-looking sensor having a sensing direction of design along a first axis and an inertia sensor configured to sense acceleration along a second axis, the second axis having a fixed relationship with respect to the first axis. The misalignment detection system also includes a signal processing system configured to receive an acceleration signal from the inertia sensor and calculate a misalignment angle between the first axis and a forward axis, the forward axis being parallel to a direction of motion.

In yet another aspect, a method of detecting angular misalignment of a forward-looking sensor assembly is provided. The method includes measuring acceleration along a first axis and outputting an acceleration signal, the first axis having a predetermined relationship with respect to a second axis, and the second axis extending along a sensing direction of design of a forward-looking sensor. The method further includes determining whether the second axis is substantially parallel with a forward axis, the forward axis extending along the direction of forward motion of the forward-looking sensor assembly. This determination is made by determining the value of the acceleration signal and comparing the value of the acceleration signal with a predetermined threshold.

Further objects, features, and advantages of this invention will become readily apparent to persons skilled in the art after a review of the following description, with reference to the drawings and claims that are appended to, and form a part of, this specification.

DETAILED DESCRIPTION OF THE INVENTION

Figure 1:
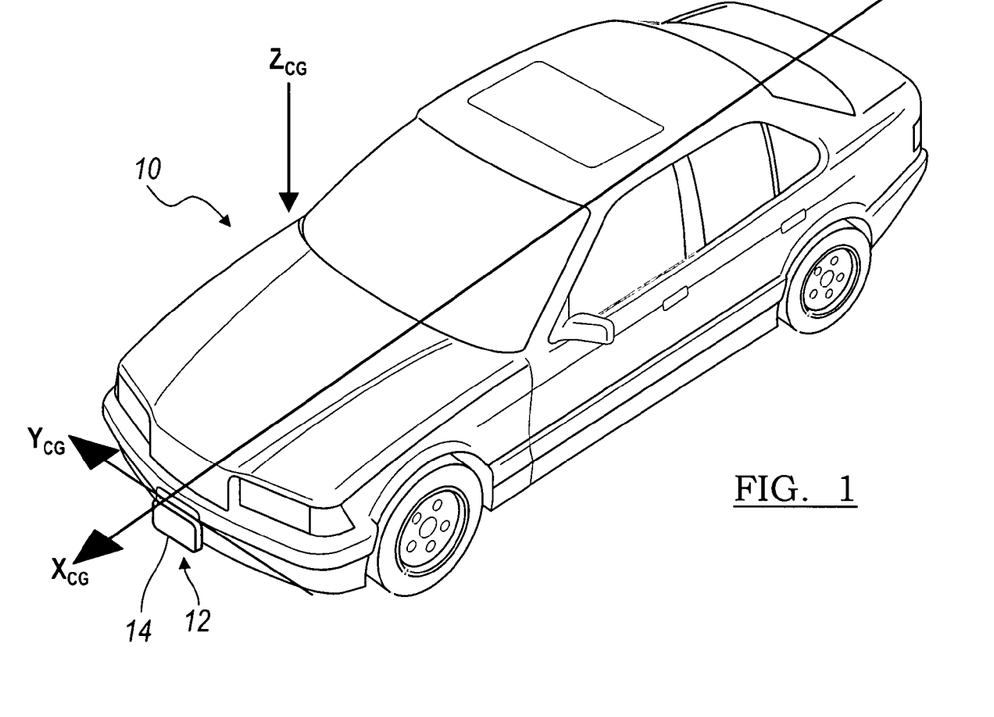
FIG. 1 is a perspective view of a motor vehicle having a misalignment detection sensor assembly in accordance with this invention attached to its front end.

Referring now to FIG. 1, a motor vehicle 10 is shown having a misalignment detection sensor assembly 12 that includes a forward-looking sensor package 14. The sensor package 14 includes a housing and is attached to the front end of the motor vehicle 10 in order to detect objects or surrounding conditions located ahead of the motor vehicle 10. The motor vehicle 10 has a forward axis $X_{CG}$ passing through its center of gravity (CG) and along which the motor vehicle 10 moves in a forward direction, i.e., the forward axis $X_{CG}$ extends along the direction of forward propulsion.

Figure 2:
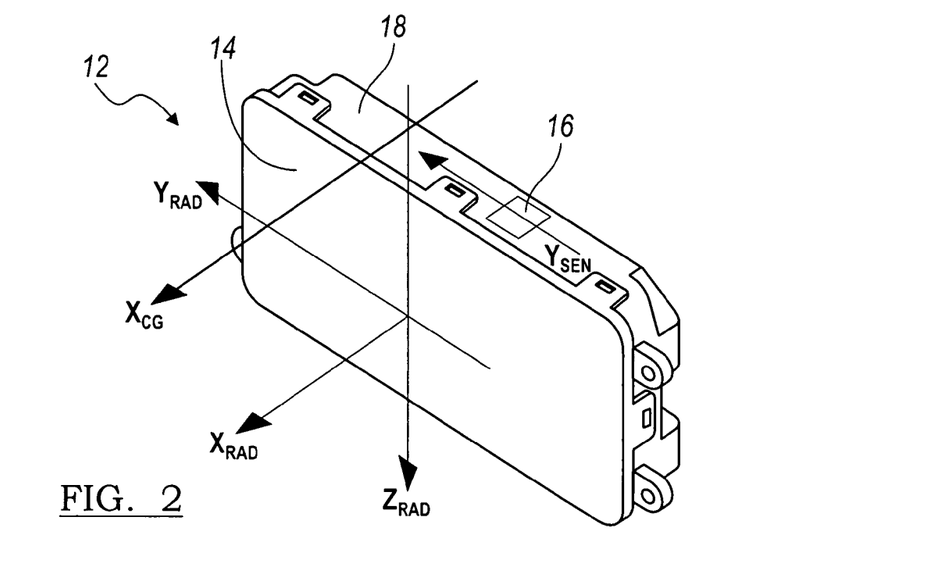
FIG. 2 is a close-up, perspective view of a first embodiment of the misalignment detection sensor assembly of FIG. 1 embodying the principles of the present invention.

Referring to FIG. 2, the misalignment sensor assembly is illustrated and designated generally at 12. The forward-looking sensor package 14 has a sensing direction of design along the axis $X_{RAD}$, which is the direction that the sensor package 14 is designed to sense. Other axes, $Y_{RAD}$ and $Z_{RAD}$, are shown, which are orthogonal to the axis $X_{RAD}$. $Y_{RAD}$ is horizontally perpendicular to the forward-sensing direction $X_{RAD}$, and $Z_{RAD}$ is vertically perpendicular to $X_{RAD}$. In some applications, it is advantageous that the sensing direction of design, $X_{RAD}$, of the forward-looking sensor package 14 is parallel with the direction of forward propulsion $X_{CG}$. When the sensing direction of design $X_{RAD}$ is aligned with the direction of forward propulsion $X_{CG}$, the forward-looking sensor package 14 is in the best position to accurately sense surrounding conditions or objects.

Figure 2A:
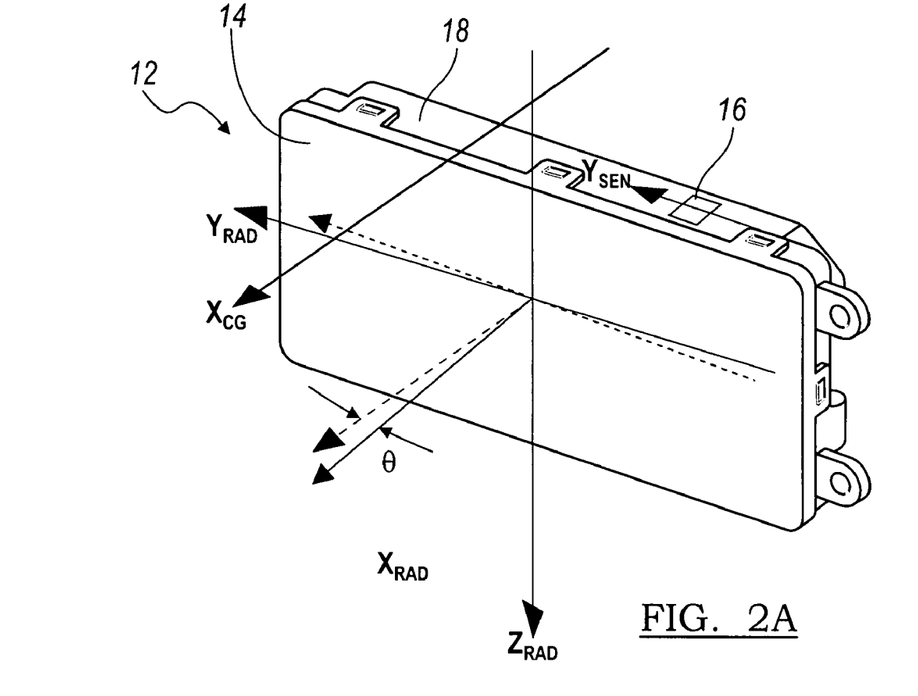
FIG. 2A is a perspective view of the misalignment detection sensor assembly of FIG. 2, wherein the sensor assembly is shown in a misaligned position.

It is possible, however, that $X_{RAD}$ could be misaligned from $X_{CG}$, as shown in FIG. 2A. This could happen, for example, if the sensor package 14 is installed in a misaligned position initially, or if the sensor package 14 is struck by an object in a collision causing the sensor package 14 to move out of its aligned position. With reference to FIG. 2A, $X_{RAD}$ is misaligned from $X_{CG}$ in a horizontal direction by an angle θ. In other words, the sensor assembly 12 is rotated about the vertical axis $Z_{CG}$ of the vehicle, resulting in horizontal misalignment of the sensor assembly by an angle θ.

Referring to FIGS. 2 and 2A, an inertia sensor 16 is fixedly attached to the housing of the sensor package 14, for example, on the top side 18 of the housing of the sensor package 14. Therefore, there is a predetermined relationship between the direction of the sensing axis $Y_{SEN}$ of the inertia sensor 16 and the sensing direction of design axis $X_{RAD}$ of the forward-looking sensor package 14. It is possible that the forward-looking sensor package 14 and the inertia sensor 16 could be misaligned with respect to each other; however, this misalignment can be corrected during production, for example, by in-factory testing after assembly.

The inertia sensor 16 is operable to sense acceleration along the sensing axis $Y_{SEN}$. The inertia sensor 16 can sense acceleration through the use of one or more accelerometers, for example. In the present embodiment, the inertia sensor 16 is fixedly attached to the sensor package 14 such that the sensing axis $Y_{SEN}$ extends parallel to the axis $Y_{RAD}$. In the alternative, it is contemplated that the sensing direction $Y_{SEN}$ could extend along another axis that is not aligned with $Y_{RAD}$, and a mathematical equivalent to acceleration along the $Y_{RAD}$ direction could be calculated.

To detect misalignment, the inertia sensor 16 measures acceleration along the $Y_{RAD}$ direction. If the misalignment sensor assembly 12 is perfectly aligned with the direction of forward propulsion $X_{CG}$, and the vehicle 10 is accelerated in a straight, forward direction, the component of acceleration along the $Y_{RAD}$ direction should be zero, absent other external factors. If the $Y_{RAD}$ axis is not perpendicular to the direction of forward propulsion $X_{CG}$ because the sensor assembly 12 is misaligned in a horizontal direction, rotated about the vertical axis $Z_{CG}$ of vehicle, the result is that a component of acceleration will be measured along the $Y_{RAD}$ axis. Thus, if the acceleration along $Y_{RAD}$ varies from zero, the sensor assembly 12 may be misaligned.

The angle of misalignment θ between the $X_{RAD}$ sensing direction and the vehicle propulsion axis $X_{CG}$ can be calculated by comparing the acceleration component along the $Y_{RAD}$ direction with the acceleration of the vehicle. As one skilled in the art would understand, when the motor vehicle 10 is accelerated in a straight, forward direction, the larger the misalignment angle θ is, the higher the magnitude of acceleration measured in the $Y_{SEN}$ direction will be, if other factors are kept constant.

Likewise, the sensor assembly 12 could be misaligned such that the sensor assembly 12 is rotated about the forward axis $X_{CG}$ of the motor vehicle 10. In other words, the sensor assembly 12 could be rotated about the roll axis of the motor vehicle 10, resulting in a vertical misalignment of the sensor assembly 12. In this configuration, the sensor assembly 12 could detect misalignment by accelerating the motor vehicle 10 in a vertical direction, for example, by causing the motor vehicle 10 to be accelerated in a vertical direction along its suspension system. If the sensor assembly 12 was perfectly aligned, $Y_{SEN}$ should sense zero acceleration, absent external factors, when the motor vehicle 10 is accelerated in a vertical direction on a flat surface. However, if the sensor assembly 12 is vertically misaligned by being rotated about the roll axis $X_{CG}$ of the motor vehicle 10, $Y_{SEN}$ will sense a component of acceleration in the vertical direction, when the motor vehicle 10 is accelerated in a vertical direction. As one having ordinary skill in the art would appreciate, in order to detect misalignment, it is preferable that the magnitude of the vertical acceleration measurement exceed the magnitude of any noise signals.

Figure 3:
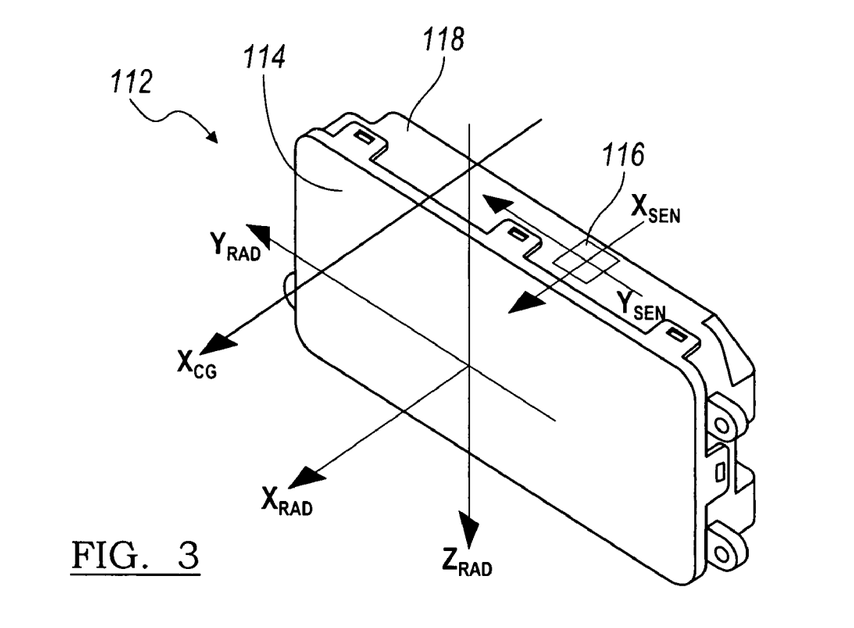
FIG. 3 is a perspective view of a second embodiment of a misalignment detection sensor assembly embodying the principles of the present invention.

Referring to FIG. 3, a second embodiment of a misalignment sensor assembly is illustrated and designated generally at 112. An inertia sensor 116 is fixedly attached to a forward-looking sensor package 114 on the top side 118 of the sensor package 114. The inertia sensor 116 has two sensitive directions located along two sensing axes $X_{SEN}$, $Y_{SEN}$, which are orthogonal to each other. The axis $X_{SEN}$ is fixed parallel to the axis of the sensing direction of design, $X_{RAD}$, of the forward-looking sensor package 114, and the axis $Y_{SEN}$ extends parallel to the direction $Y_{RAD}$. The misalignment angle θ between the directions $X_{RAD}$ and $X_{CG}$ can be estimated by processing acceleration measurements along each of the $X_{RAD}$ and $Y_{RAD}$ directions during acceleration of the vehicle 10 along a straight path, by taking measurements for $X_{SEN}$ and $Y_{SEN}$. Alternatively, acceleration measurements for $X_{SEN}$ could be approximated by using vehicle acceleration measurements obtained from other vehicle systems, such as ABS or ESP. Even if the forward-looking sensor package 114 is misaligned, an approximation of the acceleration in the $X_{SEN}$ direction will not substantially change the misalignment detection calculation, because $Y_{SEN}$ is sensitive enough to provide a measurement indicating misalignment. The acceleration measurements could be processed in various ways, as will be described in further detail below.

Figure 4:
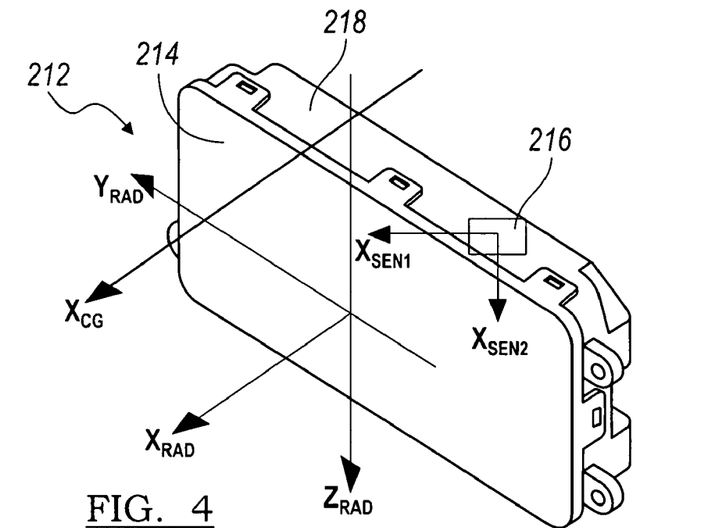
FIG. 4 is a perspective view of a third embodiment of a misalignment detection sensor assembly embodying the principles of the present invention.
Figures 4A, 5:
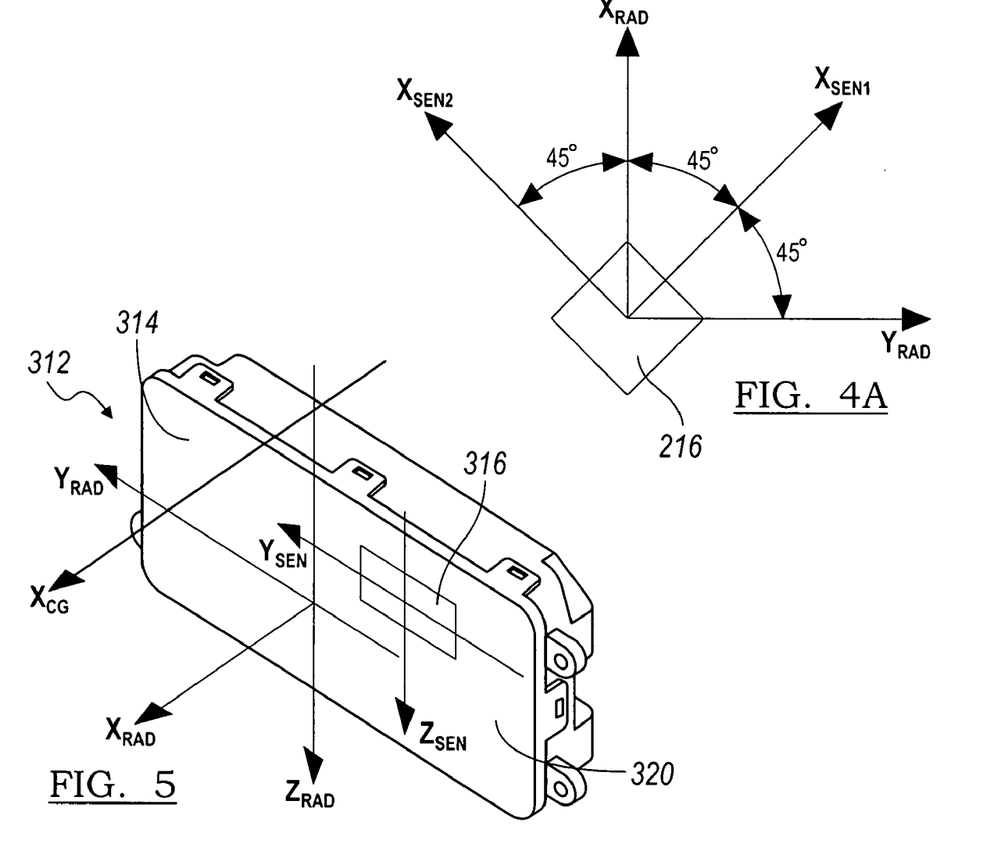
FIG. 4A is a plan view of an inertia sensor attached to the misalignment detection sensor assembly of FIG. 4.
FIG. 5 is a perspective view of a fourth embodiment of a misalignment detection sensor assembly embodying the principles of the present invention.

Referring to FIG. 4, a third embodiment of a misalignment sensor assembly is illustrated and designated generally at 212. Like the previous embodiments, an inertia sensor 216 is fixedly attached to a forward-looking sensor package 214 on the top side 218 of the sensor package 214. The inertia sensor 216 has two sensitive directions located along two sensing axes, $X_{SEN1}$, $X_{SEN2}$, which are orthogonal to each other. With reference to FIG. 4A, the axis $X_{SEN1}$ is located along a 45-degree angle from the sensing direction of design $X_{RAD}$ of the forward-looking sensor package 214. The axis $X_{SEN2}$ is also located along a 45-degree angle from the sensing direction of design $X_{RAD}$; thus, $X_{RAD}$ is located between $X_{SEN1}$ and $X_{SEN2}$. The inertia sensor 216 obtains acceleration measurements, $a_{XSEN1}$ and $a_{XSEN2}$, along the axes $X_{SEN1}$ and $X_{SEN2}$, which can be converted to acceleration along $X_{RAD}$ and $Y_{RAD}$ by using the following equation:

$$\begin{pmatrix} a_{XRAD} \\ a_{YRAD} \end{pmatrix} = \frac{1}{\sqrt{2}} \begin{pmatrix} a_{XSEN1} + a_{XSEN2} \\ a_{XSEN1} - a_{XSEN2} \end{pmatrix}.$$

The calculated acceleration components $a_{XRAD}$ and $a_{YRAD}$ can be processed to determine whether the sensing direction of design $X_{RAD}$ is misaligned from the direction of forward propulsion $X_{CG}$.

Alternatively, instead of converting the measurements for $a_{XSEN1}$ and $a_{XSEN2}$ into acceleration along the $X_{RAD}$ and $Y_{RAD}$ directions, $a_{XSEN1}$ and $a_{XSEN2}$ could be simply compared to each other. As one skilled in the art would appreciate, if there is any substantial difference between acceleration along $X_{SEN1}$ and $X_{SEN2}$ ($a_{XSEN1}$ and $a_{XSEN2}$) when the vehicle 10 is accelerated along a straight, forward path, the sensor may be misaligned. In other words, if acceleration is measured along paths that are equally angularly separated from $X_{RAD}$ on each side of $X_{RAD}$, then each should measure equal components of acceleration in the $X_{RAD}$ direction if $X_{RAD}$ is aligned with $X_{CG}$. Likewise, if $X_{RAD}$ is misaligned from $X_{CG}$, then acceleration along $X_{SEN1}$ and $X_{SEN2}$ will not be equal, because one will measure a greater component of acceleration due to the fact that one is more closely angularly aligned with the direction of forward propulsion $X_{CG}$.

The $X_{SEN1}$ and $X_{SEN2}$ directions need not be located be located 45 degrees from the directions of $X_{RAD}$ and $Y_{RAD}$. Instead, the $X_{SEN1}$ and $X_{SEN2}$ directions could be located in a direction having any predetermined angular relationship with respect to $X_{RAD}$ and $Y_{RAD}$, and the acceleration components in the $X_{RAD}$ and $Y_{RAD}$ directions could be calculated using an equation similar to the one above, substituting in the corresponding constant for the particular angular relationship used.

Referring to FIG. 5, a fourth embodiment of a misalignment sensor assembly is illustrated and designated generally at 312. An inertia sensor 316 is fixedly attached to a forward-looking sensor package 314 on the front side 320 of the sensor package 314. The inertia sensor 116 has two sensitive directions located along two sensing axes $Y_{SEN}$, $Z_{SEN}$, which are orthogonal to each other. The axis $Y_{SEN}$ is fixed parallel to the direction $Y_{RAD}$ of the forward-looking sensor package 114, and the axis $Z_{SEN}$ extends parallel to the direction $Z_{RAD}$.

In the configuration of FIG. 5, it is possible to estimate a misalignment angle in both the horizontal and vertical directions by using only one dual-axis inertia sensor 316. The misalignment angle θ between the directions $X_{RAD}$ and $X_{CG}$ can be estimated by processing the acceleration measurement along the $Y_{RAD}$ direction, as described above with respect to the embodiment of FIG. 2.

The angular misalignment with respect to the direction $Z_{RAD}$ is calculated in a substantially similar way. It is desirable that the direction $Z_{RAD}$ be aligned with the direction of gravity, $Z_{CG}$, at the center of gravity of the motor vehicle 10 when the motor vehicle 10 is parked or traveling on a flat surface. As the vehicle 10 is accelerated in a straight, forward direction, when $Z_{SEN}$ is aligned with $Z_{RAD}$, and $Z_{SEN}$ is parallel to $Z_{CG}$ in an aligned position, the acceleration measurement along the direction $Z_{SEN}$ should be zero, absent other external factors.

However, the sensor assembly 312 could be misaligned such that the sensor assembly 312 is rotated around the horizontal axis perpendicular to $X_{CG}$, which is $Y_{CG}$, resulting in the front side 320 of the sensor package 314 tilting upward toward the sky. In other words, the sensor assembly 312 could be rotated along the pitch axis of the vehicle, resulting in vertical misalignment. The inertia sensor 316 is operable to sense this vertical misalignment, because there would be a component of acceleration not equal to zero measured along the axis $Z_{SEN}$ when the motor vehicle 10 is accelerated in a straight-forward path along a flat surface.

The angle of misalignment between the $Z_{RAD}$ sensing direction and the axis $Z_{CG}$ can be calculated by comparing the acceleration component along the $Z_{RAD}$ direction with the acceleration of the vehicle. It should be noted that this relationship is true when the vehicle 10 is being accelerated along a flat surface. If the vehicle 10 is accelerating or decelerating up or down a hill, $Z_{SEN}$ would sense an acceleration component even if properly aligned, as one skilled in the art would appreciate, since the vertical axis of the vehicle 10 would not be aligned with gravity.

Figure 6:
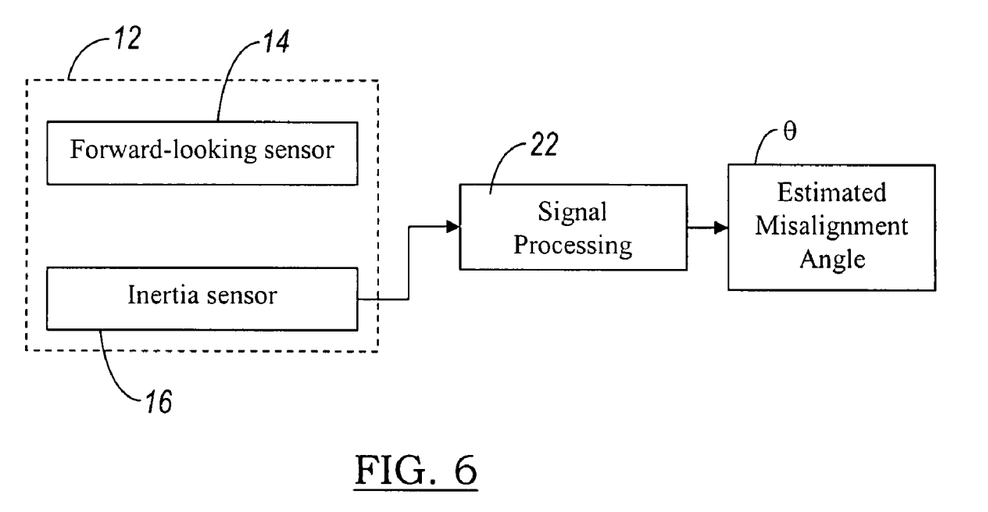
FIG. 6 is a block diagram of a first embodiment of a system embodying the principles of the present invention.

With reference to FIG. 6, a misalignment detection system is provided. The misalignment detection system includes a misalignment detection sensor assembly 12 and signal processing system 22. The sensor assembly 12 includes a forward-looking sensor package 14 having a sensing direction of design along a first axis and an inertia sensor 16 configured to sense acceleration along a second axis, the second axis having a fixed relationship with respect to the first axis, as described above with reference to FIGS. 2-2A.

The signal processing system 22 is configured to receive an acceleration signal from the inertia sensor 16 and calculate an estimated misalignment angle θ between the first axis and a forward axis, the forward axis being parallel to a direction of forward motion $X_{CG}$ of the sensor assembly 12. It should be understood that the signal processing system 22 need not be encased within a single tangible object, but may be any means contemplated by one of ordinary skill in the art to process signals.

Figure 7:
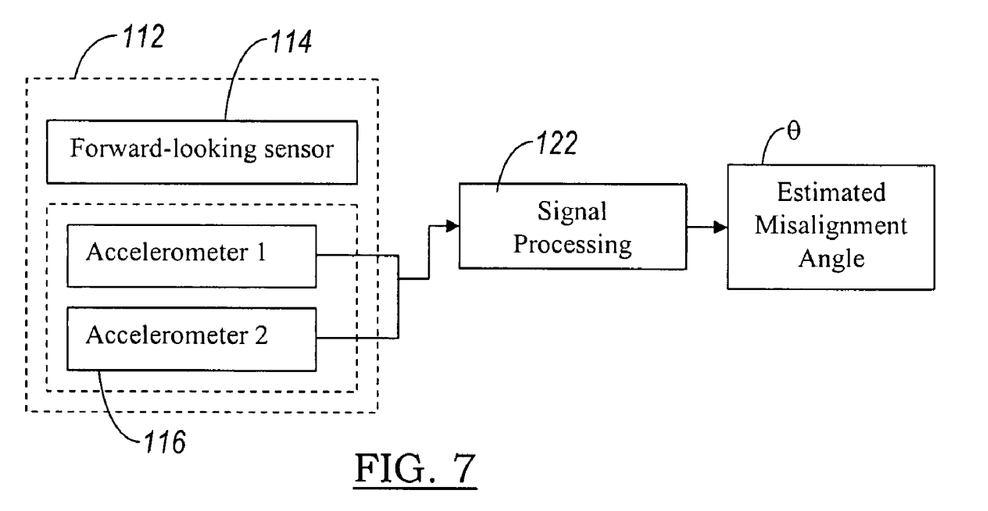
FIG. 7 is a block diagram of a second embodiment of a system embodying the principles of the present invention.

Likewise, with reference to FIG. 7, the sensor assemblies 112, 212, 312 of the embodiments of FIGS. 3-5 may be used with the signal processing system 122 to calculate a misalignment angle θ. In this embodiment, the signal processing system 112 receives two input values (af1, af2) from the dual-axis inertia sensor 116. The inertia sensor 116 could have a first accelerometer to output a first acceleration signal af1 and a second accelerometer to output a second acceleration signal af2. In the alternative, multiple inertia sensors 116 could be used to measure acceleration and provide input values af1, af2 to the signal processing system 122.

Figure 8:
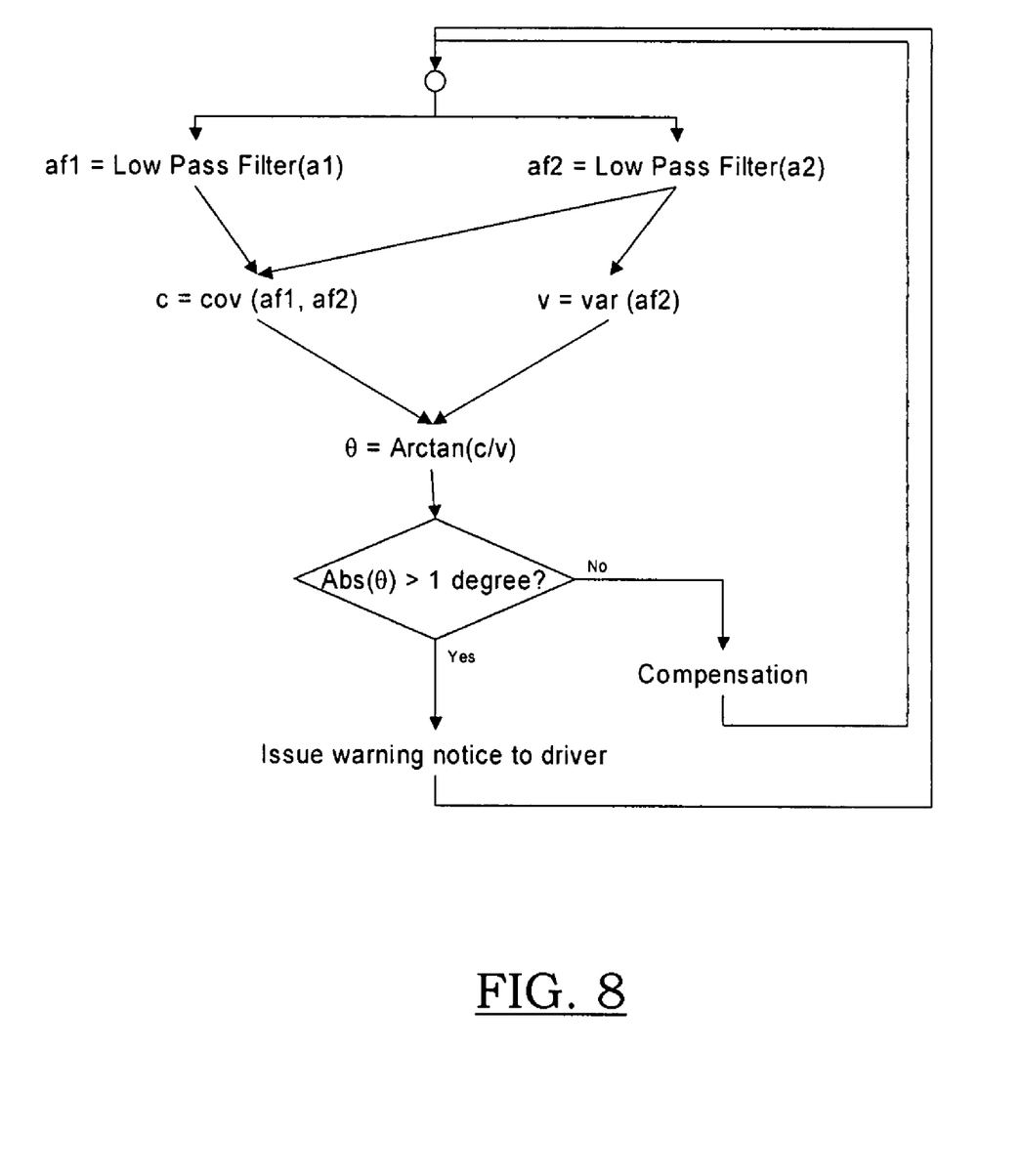
FIG. 8 is a flow chart of an embodiment of an algorithm that may be used to implement a method of using the present invention.

Various methods could be used by the signal processing system 112 for calculating the misalignment angle θ. For example, a statistical way to estimate the misalignment angle θ is the Minimum Mean Square Error Estimator (MMSEE). The following illustrates an equation that could be used to obtain values for θ using the MMSEE:

$$\theta = \tan^{-1} \frac{\text{cov}(a_{XRAD}, a_{YRAD})}{\text{var}(a_{XRAD})},$$

where θ is the misalignment angle, $a_{XRAD}$ is the acceleration measured in the $X_{RAD}$ direction, and $a_{YRAD}$ is the acceleration measured in the $Y_{RAD}$ direction. With reference to FIG. 8, $a_{XRAD}$ and $a_{YRAD}$ are input into the signal processing system 122 as af1 and af2, respectively.

FIG. 8 shows an algorithm that could be used by the signal processing system to determine the misalignment angle θ and execute subsequent functions based on the value of the misalignment angle θ. For example, the signal processing system 122 could be configured to produce an alert signal when the misalignment angle θ exceeds a predetermined threshold. In the algorithm of FIG. 8, if the absolute value of θ exceeds one degree, an alert signal is sent to the driver of the motor vehicle 10. This is a likely scenario when, for example, a vehicle is involved in a crash resulting in the sensor assembly 114 being displaced from an aligned position.

Likewise, the signal processing system 122 could be configured to compensate the sensitive measurement of the forward-looking sensor package 114, based upon the misalignment angle θ. For example, in FIG. 8, the signal processing system 122 is configured to compensate the sensitive measurement of the forward-looking sensor package 114 when the absolute value of the misalignment angle θ is misaligned by less than one degree, but by greater than another predetermined threshold that is close to zero.

Furthermore, a method of detecting angular misalignment of a forward-looking sensor assembly 112 is disclosed. The method includes measuring acceleration along a first axis, the first axis having a fixed relationship with respect to a sensing axis $X_{RAD}$ of a forward-looking sensor package 114 and outputting a first acceleration signal af1. The method also includes determining whether the sensing axis $X_{RAD}$ of the forward-looking sensor package 114 is substantially parallel with a forward axis $X_{CG}$ extending along the direction of forward motion of the forward-looking sensor assembly 112, based on the value of the acceleration signal af1, using a method involving determining the value of the acceleration signal af1 and comparing that value with a predetermined threshold.

The method of misalignment detection contemplated herein could also involve calculating a misalignment angle θ between the forward axis $X_{CG}$ and the sensing axis $X_{RAD}$ of the forward-looking sensor package 114. The misalignment angle θ could then be compared to a predetermined limit. Furthermore, the misalignment angle θ could be compensated for, or an alert signal could be produced, based on the amount that the misalignment angle θ differs from predetermined threshold(s).

The method could alternatively involve measuring acceleration along two axes and using both measurements to calculate a misalignment angle θ between the forward axis $X_{CG}$ and the sensing axis $X_{RAD}$ of the forward-looking sensor package 114, as described above and with reference to FIG. 8. The MMSEE method could be used to estimate the misalignment angle θ, or the misalignment angle θ could be estimated by other methods such as the maximum likelihood estimator, the Kalman filter, or the least-squares estimator, for example.

In order to determine misalignment, it is preferable that the sensor assemblies 12, 112, 212, 312 of the present invention be accelerated along a straight, forward path when measuring acceleration with inertia sensors 16, 116, 216, 316. As one having ordinary skill in the art would appreciate, an object accelerating in a non-straight direction has components of acceleration along both a forward axis and an axis pointing toward the center of curvature, which is the centripetal component of acceleration. Therefore, one having ordinary skill in the art would understand that it would be preferable to be able to determine when the motor vehicle 10 is moving in a straight path or a curved path.

Various methods may be used to determine whether the vehicle 10 is moving along a straight path within the spirit of the present invention. For example, the steering wheel angle (SWA) can be determined from the vehicle dynamic control system and compared with a predetermined threshold for a straight steering wheel angle (SWA). Likewise, the speed of the vehicle (determined in a conventional way, such from the ABS or ESP systems) can be multiplied by the yaw rate (determined from the vehicle dynamic control system) and compared to a predetermined threshold for this value, in order to determine whether a vehicle 10 is moving along a straight path. An algorithm may be implemented to compare these criteria and determine whether the vehicle 10 is driving in a straight path.

It is contemplated that such a determination of straight, forward motion may be made by the signal processing system 22, 122 of the present invention in order to provide for an accurate determination of angular misalignment of the sensor assembly 12, 112, 212, 312.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention, and as defined in the following claims.

We claim:

1. A misalignment detection sensor assembly for a motor vehicle comprising:
   a forward-looking sensor package having a housing and a forward-looking sensor, the forward-looking sensor having a sensing direction along a first axis $X_{RAD}$; and
   an inertia sensor fixed to the housing, the inertia sensor configured to sense acceleration along a second axis, the second axis having a fixed, non-parallel relationship with respect to the first axis $X_{RAD}$; and
   a signal processor in electrical communication with the inertia sensor, the signal processor configured to receive an acceleration signal from the inertia sensor and calculate a misalignment angle between the first axis $X_{RAD}$ and a forward axis $X_{CG}$, the forward axis $X_{CG}$ being parallel to a direction of motion of the sensor assembly, wherein the inertia sensor is further configured to sense acceleration along a third axis $X_{SEN}$, the third axis $X_{SEN}$ being orthogonal to the second axis and parallel to the first axis $X_{RAD}$.

2. The misalignment detection sensor assembly of claim 1, wherein the signal processor is in electrical communication with the forward-looking sensor.

3. The misalignment detection sensor assembly of claim 2, wherein the assembly is further configured to produce an alert signal when the misalignment angle exceeds a predetermined threshold.

4. The misalignment detection sensor assembly of claim 2, wherein the assembly is further configured to compensate a sensitive measurement of the forward-looking sensor based upon the misalignment angle.

5. The misalignment detection sensor assembly of claim 1, wherein the forward-looking sensor is a radar sensor.

6. The misalignment detection sensor assembly of claim 1, the inertia sensor comprising an accelerometer.

7. A misalignment detection sensor assembly for a motor vehicle comprising:
   a radar sensor package having a housing and a radar sensor, the radar sensor having a sensing direction along a first axis;

an inertia sensor fixed to the housing, the inertia sensor configured to sense acceleration along a second axis, the second axis having a fixed, non-parallel relationship with respect to the first axis; and a signal processor in electrical communication with the inertia sensor, the signal processor configured to receive an acceleration signal from the inertia sensor and calculate a misalignment angle between the first axis and a forward axis, the forward axis being parallel to a direction of motion of the sensor assembly, wherein the inertia sensor is further configured to sense acceleration along a third axis, the third axis being orthogonal to the second axis, and wherein the second axis extends in a direction about 45 degrees from the direction of the first axis.

8. A misalignment detection system comprising:

a forward-looking sensor package having a housing and a forward-looking sensor, the forward-looking sensor having a sensing direction along a first axis $X_{RAD}$;

an accelerometer assembly configured to sense acceleration along a second axis, the second axis having a fixed, non-parallel relationship with respect to the first axis $X_{RAD}$, the accelerometer assembly being further configured to sense acceleration along a third axis $X_{SEN}$, the third axis $X_{SEN}$ being orthogonal to the second axis and parallel to the first axis $X_{RAD}$; and a signal processing system configured to receive an acceleration signal from the accelerometer assembly and calculate a misalignment angle between the first axis $X_{RAD}$ and a forward axis $X_{CG}$, the forward axis $X_{CG}$ being parallel to a direction of motion of the sensor package.

9. The misalignment detection system of claim 8, wherein the signal processing system is further configured to produce an alert signal when the misalignment angle exceeds a predetermined threshold.

10. The misalignment detection system of claim 8, wherein the signal processing system is further configured to compensate a sensitive measurement of the forward-looking sensor based upon the misalignment angle.

11. The misalignment detection system of claim 8, wherein the signal processing system is further configured to determine whether a motor vehicle to which the sensor package is attached is traveling in a straight, forward direction.

12. The misalignment detection system of claim 8, the forward-looking sensor being a radar sensor.

13. A misalignment detection sensor assembly for a motor vehicle comprising:

a forward-looking sensor package having a housing and a forward-looking sensor, the forward-looking sensor having a sensing direction along a first axis;

an inertia sensor fixed to the housing, the inertia sensor configured to sense acceleration along a second axis, the second axis having a fixed, non-parallel relationship with respect to the first axis;

wherein the inertia sensor is further configured to sense acceleration along a third axis, the third axis being orthogonal to the second axis; and wherein the second axis extends in a direction about 45 degrees from the direction of the first axis.

14. The misalignment detection system of claim 13, the inertia sensor comprising an accelerometer configured to sense linear acceleration in at least two orthogonal directions.

15. A misalignment detection sensor assembly for a motor vehicle comprising:

a forward-looking sensor package having a forward-looking sensor, the forward-looking sensor having a sensing direction along a forward-looking axis;

an inertia sensor configured to sense a first acceleration along a first axis extending in a direction about 45 degrees from the direction of the forward-looking axis and output a first acceleration signal based on the first acceleration, the inertia sensor being further configured to sense a second acceleration along a second axis extending in a direction about 45 degrees from the direction of the forward-looking axis and output a second acceleration signal based on the second acceleration, the second axis being orthogonal to the first axis; and a signal processing system in electrical communication with the inertia sensor, the signal processing system configured to receive the first and second acceleration signals from the inertia sensor, calculate the difference between the first and second acceleration signals, and compare the difference to determine whether the forward-looking axis is about parallel to a direction of motion of the sensor assembly.

16. The misalignment detection sensor assembly of claim 15, wherein the inertia sensor is further configured to sense acceleration along a third axis, the third axis being orthogonal to the second axis.

17. The misalignment detection sensory assembly of claim 15, further comprising a second inertia sensor, the second inertia sensor being operable to sense acceleration along a third axis.

18. The misalignment detection system of claim 15, the inertia sensor comprising an accelerometer.

19. The misalignment detection sensor assembly of claim 15, wherein the signal processing system is in electrical communication with the inertia sensor and the assembly is further configured to produce an alert signal when the misalignment angle exceeds a predetermined threshold.

* * * * *